United States Patent [19]

Tanaka et al.

[11] Patent Number: 5,272,011
[45] Date of Patent: Dec. 21, 1993

[54] COPOLYESTER RESIN FILM LAMINATED METAL SHEET

[75] Inventors: Atsuo Tanaka; Tetsuhiro Hanabusa, both of Tokuyama; Harunori Kojo, Yamaguchi; Tsuneo Inui, Tokuyama, all of Japan

[73] Assignee: Toyo Kohan Co., Ltd., Tokyo, Japan

[21] Appl. No.: 815,646

[22] Filed: Dec. 30, 1991

Related U.S. Application Data

[63] Continuation-in-part of Ser. No. 419,217, Oct. 11, 1989, abandoned.

[51] Int. Cl.$^5$ ............................................. B32B 15/08
[52] U.S. Cl. ................................... 428/418; 220/410; 428/425.8; 428/458; 428/469; 428/480; 428/910
[58] Field of Search .................. 428/458, 418, 425.8, 428/469, 480, 910; 220/410

[56] References Cited

FOREIGN PATENT DOCUMENTS 2164899 4/1986 United Kingdom ................ 428/458
8903303 4/1989 United Kingdom ................ 428/458

Primary Examiner—Paul J. Thibodeau
Assistant Examiner—H. Thi Lê
Attorney, Agent, or Firm—Felfe & Lynch

[57] ABSTRACT

A copolyester resin film laminated metal sheet having excellent formability and a method for its production is disclosed. This disclosure comprises laminating a biaxially oriented copolyester resin film having specified characteristics, to one or both sides of a surface treated metal sheet, which has been heated to the melting point of the copolyester resin film ±50° C., just before the lamination of the copolyester resin film. This film has been precoated with a resin composite containing in its molecular structure at least one radical, such as epoxy radical and hydroxyl radical. The side of the copolyester resin film pre-coated with resin composite is in contact with the surface treated metal sheet. This copolyester resin film laminated metal sheet is suitable for some applications in which severe formability is required, such as deeply drawn cans formed by multiple drawings, drawn and partially ironed cans, drawn and stretch formed cans, can ends wherein a tab for easy opening is attached, screwed caps and crown caps.

13 Claims, 1 Drawing Sheet

COPOLYESTER RESIN FILM LAMINATED METAL SHEET

This application is a continuation-in-part of application Ser. No. 07/419,217, filed Oct. 11, 1989 now abandoned.

BACKGROUND OF THE INVENTION

1. Field of the Invention

The present invention relates to a copolyester resin film laminated metal sheet having excellent formability and its method of production. The process comprises laminating a biaxially oriented copolyester resin film, having specified characteristics, precoated with a small amount of a resin composite, the resin composite containing at least one radical, such as an epoxy radical or a hydroxyl radical on one or both sides of a surface treated metal sheet which has been heated to the melting point of the copolyester resin film ±50° C. just before the lamination of the copolyester resin film. The side of the copolyester resin film precoated with the resin composite is in contact with the surface treated metal sheet.

2. Brief Description of the Prior Art

At present, metal sheets, such as electrotinplate, tin free steel and aluminum sheets are widely used for can stock after being coated, at least once, with lacquer. This lacquer coating is disadvantageous from an energy standpoint as significant time is required for curing the lacquer and large volumes of solvent discharged during the lacquer curing process must be burned in another furnace in order to prevent air pollution.

Recently, lamination of thermoplastic resin film on a metal sheet was attempted in order to avoid these problems. See for example, Laid-Open Japanese Patent Application No. Sho 53-141786, Japanese Patent Publication No. Sho 60-47103, Laid-Open Japanese Patent Application Nos. Sho 60-168643, Sho 61-20736 and Sho 61-149341.

Laid-Open Japanese Patent Application No. Sho 53-141786 discloses a metal can produced from a metal sheet covered with polyolefin resin film, using an adhesive containing polyolefin resin modified with a carboxyl radical. However, this polyolefin film laminated metal sheet cannot be used as a material for can stock as the metal sheet can become corroded by the packed contents due to the poor permeability resistance of the laminated polyolefin resin film. Furthermore, even if the polyolefin resin film laminated metal sheet is used as a material for can stock, cans having satisfactory appearance cannot be obtained because the laminated polyolefin resin film is melted during heating at temperatures of from 160° to 200° C. These temperatures are required for curing the printing ink or the coated lacquer.

Japanese Patent Publication No. Sho 60-47103 relates to a process for lamination of a crystalline polyester resin film to a metal sheet by heating the sheet above the melting point of said polyester resin film and thereafter immediately quenching the laminate. In this patent, the crystalline polyester film is sufficiently adhered to the metal sheet by an amorphous and non-oriented polyester resin film that is formed at the interface of the crystalline polyester film and the metal sheet as a result of the heating step. However, when the polyester film laminated metal sheet is reheated to 160° to 200° C. for 10 to 30 minutes, as required for curing the printing ink or lacquer applied on the other side of the metal sheet before forming, adhesion of the polyester resin film deteriorates. This is due to the amorphous non-oriented polyester resin layer recrystallizing upon heating. As a result, corrosion resistance also deteriorates.

Laid-Open Japanese Patent Application No. Sho 60-168643 relates to a thermoplastic resin film laminated steel sheet for a drawn and ironed can (DI can) and the production method therefor. In said patent, the side of the steel sheet to be employed for the inside of the DI can is laminated with a thermoplastic resin film, such as polyethylene terephthalate, without any adhesives. The side of the steel sheet to be employed for the outside of the DI can is plated with a ductile metal, such as tin, nickel or aluminum.

The steel sheet according to said patent has the same defects as those in Japanese Patent Publication No. Sho 60-47103, i.e., as a result of the reheating to the 160° to 200° C. for 10 to 30 minutes required for curing the printing ink and the lacquer on the outside of the DI can, the adhesion of the polyester resin film noticeably deteriorates.

Laid-Open Japanese Patent Application Nos. Sho 61-20736 and Sho 61-149341 relate to lamination of a precoated biaxially oriented polyester resin film to a metal sheet heated below the melting point of said polyester resin film. The film is precoated with a special adhesive, such as an epoxy resin containing a curing agent. In said patents, an amorphous and non-oriented polyester resin layer as shown in Japanese Patent Publication No. Sho 60-47103 and Laid-Open Japanese Patent Application No. Sho 60-168643 is not formed. This is because the lamination of biaxially oriented polyester resin film to the metal sheet is carried out below the melting point of said polyester resin film. Therefore, the corrosion resistance and the adhesion of polyester resin film to the metal sheet does not deteriorate, even if it is reheated at temperatures of 160° to 200° C. for the time required for curing printing ink and lacquer. However, if said laminated metal sheet is used for some applications requiring more severe formability, such as a deep drawn can having a drawing ratio higher than 2.0, many cracks occur in the polyester resin film.

Recently, the use of a polyester resin film having specified characteristics has been proposed in order to improve the formability of the polyester resin film laminated metal sheet (Laid-Open Japanese Patent Application No. Sho 64-22530 and Japanese Patent Application No. Sho 63-75837). However, when these polyester resin film laminated metal sheets are formed in processes such as deep drawing or bending at high speed, many cracks arise or the laminated polyester resin film is peeled off in the formed area of said polyester resin film.

SUMMARY OF THE INVENTION

Accordingly, it is the first objective of the present invention to provide a surface treated metal sheet covered with copolyester resin film having excellent corrosion resistance in a part formed under severe conditions, such as a deeply drawn can, a drawn and partially ironed can and a drawn and stretch formed can having high can height above 2.0 in drawing ratio, even after reheating to cure overcoated color printing ink or lacquer.

It is the second objective of the present invention to provide a method for continuous high speed lamination of copolyester resin film on one o both sides of the surface treated metal sheet.

The first objective of the present invention can be accomplished by the formation of a film consisting of an outer layer and an inner layer on the surface of a metal layer. The outer layer is comprised of a copolyester resin film possessing specific characteristics and is produced by stretching and heat setting a copolyester resin film consisting of 75 to 99 mole % of polyethylene terephthalate and 25 to 1 mole % of a polyester resin produced by esterification of at least one saturated polycarboxylic acid with at least one saturated polyalcohol. The inner layer comprises a thin resin composite containing in its molecular structure, at least one radical, such as epoxy radical and hydroxyl radical. The composite layer is present on one or both sides of the surface treated metal sheet.

The second objective of the present invention can be accomplished by continuous high speed lamination of the copolyester resin film precoated with resin composite, onto one or both sides of a surface treated metal sheet that has been heated to ±50° C. of the melting point of the copolyester resin film, with the precoated side of the copolyester resin film being in contact with the metal sheet.

The specific characteristics referred to supra are:
(1) melting temperature;
(2) refractive index of the film's thickness;
(3) refractive index of the film's planar dimensions; and
(4) amount and average particle size of added lubricant, when lubricant is added thereto.

The copolyester resin film laminated metal sheet having an excellent formability according to the present invention can be obtained by controlling all of these factors in the optimum ranges as disclosed below.

The copolyester resin film laminated metal sheet according to the present invention can be used in applications where excellent corrosion resistance is required after severe forming. Examples are deeply drawn cans, drawn and partially ironed cans, drawn and stretch formed cans having high can height and a high drawing ratio and can ends where a tab for easy opening is attached. In these applications, the cans are exposed to hot water or hot steam for sterilization after packing food, such as fruit juices, coffee drinks, meats and fish. For example, fruit juices are immediately packed in the can after sterilization, at a temperature of 90° to 100° C. Coffee drinks, meats and fish are sterilized by hot steam at a temperature above 100° C. in a retort after being packed in the can. Furthermore, the metal sheet according to the present invention can be used for screwed caps and crown caps.

In these applications, color printing ink or lacquer coating on one or both sides of the metal sheet used for the outside or inside of these cans is often carried out before or after forming. In these cases, the laminated copolyester resin film in the present invention is not peeled off in the severely formed areas, even after reheating for curing color printing ink or lacquer and subsequent treatment by hot water or hot steam.

DETAILED DESCRIPTION OF THE INVENTION

Figure 1:
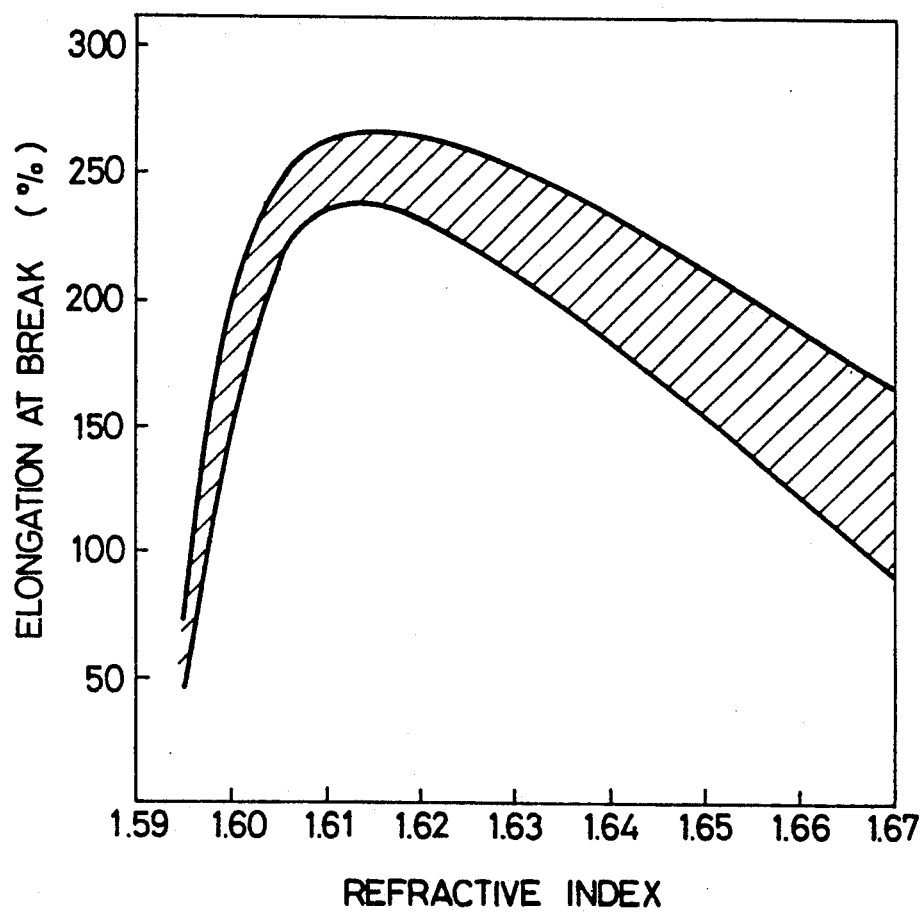
FIG. 1 depicts, graphically, the relationship between the index of refraction of a given copolymer and the degree of elongation possible before the copolymer film breaks.

The present invention is a laminated metal sheet where the metal sheet is laminated with copolyester resin film having specified characteristics, consisting of 75 to 99 mole % of polyethylene terephthalate and 25 to 1 mole % of a polyester resin produced by the esterification of at least one saturated polycarboxylic acid with at least one saturated polyalcohol selected from the following polycarboxylic acids and polyalcohols.

Saturated polycarboxylic acids are selected from phthalic acid, isophthalic acid, terephthalic acid, succinic acid, azelaic acid, adipic acid, sebacic acid, diphenyl carboxylic acid, 2,6-naphthalene dicarboxylic acid, 1,4-cyclohexane dicarboxylic acid and trimellitic acid anhydride.

Saturated polyalcohols are selected from ethylene glycol, 1,4-butane diol, 1,5-pentane diol, 1,6-hexane diol, propylene glycol, polytetramethylene glycol, trimethylene glycol, triethylene glycol, neopenthyl glycol, 1,4-cyclohexane dimethanol, trimethylol propane and pentaerythritol.

Furthermore, in the present invention, the use of biaxially oriented copolyester resin film having all of the following factors in some optimum range is indispensable from the viewpoint of corrosion resistance after severe forming. These factors are:
(1) melting temperature;
(2) refractive index of the film's thickness;
(3) refractive index of the film's planar dimensions; and
(4) amount and average particle size of added lubricant, when lubricant is added thereto.

In some cases, additives such as antioxidants, stabilizer, pigments, antistatic agents and corrosion inhibitors are added during the manufacturing process of the copolyester resin film.

The melting temperature of the employed copolyester resin film is defined as the temperature at which the endothermic peak is obtained at a heating rate of 10° C./minute in the differential scanning calorimeter (SS10) made by Seiko Denski Kogyo Co. It is preferred that a copolyester resin film having a melting temperature of from about 210° to about 250° C. should be used. The use of a copolyester resin film having a melting temperature above 250° C. is not suitable in the present invention as such rigid copolyester resin films have poor formability. A copolyester resin film having a melting temperature below 210° C. is not practical as its mechanical property deteriorates upon the reheating required to cure the color printing ink or lacquer applied to the outside or inside of the can.

The refractive indexes, the second and third factors mentioned, are measured by using a polarized monochromatic light in Abbe's refractometer at 25° C.

In the biaxially oriented copolyester resin film used in the present invention, the refractive indexes in the thickness direction and all planar dimensions in the plane should be in the range of from about 1.5000 to about 1.5500 and from about 1.6000 to about 1.6600, respectively. These refractive indexes change slightly depending upon conditions used to laminate the copolyester resin film to the metal sheet, as well as reheating conditions necessary to cure the color printing ink or lacquer applied to the copolyester resin film laminated metal sheet. The degree of change in the refractive index of said copolyester resin film also depends on the stretching conditions and heat setting conditions for the production of thin and wide copolyester resin film. For example, if the laminating temperature of the copolyester resin film is higher, the refractive index of the laminated copolyester resin film decreases. The refractive index of the copolyester resin film produced under lower stretching and heat setting at higher temperature decreases. On the other hand, the refractive index produced under higher stretching and heat setting at lower temperature increases.

As described above, the refractive index of the copolyester resin film is dependant upon the manufacturing conditions of copolyester resin film, the laminating conditions and the reheating conditions.

In the present invention, it is necessary that the refractive indexes in the thickness direction and all planar dimensions of the copolyester resin film should be controlled in the rang of from about 1.5000 to about 1.5500 and from about 1.6000 to about 1.6600, respectively, after the lamination to the surface treated metal sheet. It is preferred that the refractive index in all directions in the plane of the copolyester resin film be maintained in the range of 1.6100 to 1.6500 after lamination, in order to obtain a copolyester resin film laminated metal sheet having excellent formability.

Copolyester resin films having refractive indexes beyond the optimum range described above, are not practical for some applications where severe formability is required. Many cracks may arise in said copolyester resin film or the laminated copolyester resin film may be peeled off in the severe formed area as a result of the deterioration in formability.

Laid-Open Japanese Patent Application No. Sho 64-22530 and Japanese Patent Application No. Sho 63-75837 disclose polyester resin film laminated metal sheet having excellent formability.

The former patent application shows that a polyester resin film with excellent formability is obtained by controlling the planar orientation coefficient in the range of from 0.130 to 0.160. This planar orientation coefficient, which is defined as the degree of the planar coefficient of the polyester resin film, is determined by using a refractometer and is shown by the following equation:

$$A = (B+C)/2 - D,$$

where, A represents the planar orientation coefficient of the polyester resin film,
B represents the refractive index in the lengthwise direction of the polyester resin film,
C represents the refractive index in the widthwise direction of the polyester resin film, and
D represents the refractive index in the thickness direction of the polyester resin film.

Usually, the thin and wide polyester resin film is produced continuously by stretching the extruded thick polyester resin film in the lengthwise and widthwise directions. Therefore, the characteristics in the center position of the wide polyester resin film are different from those in the edge position, particularly, the mechanical property and the coefficient of expansion by heat in the oblique direction in the edge position of the wide film.

Even if the planar orientation coefficient in the center position of the wide polyester resin film is the same as that in the edge position, the characteristics in the center position are different from that in the edge position, because the planar orientation coefficient calculated by the equation described above is defined without consideration of the refractive index in the oblique direction of the polyester resin film. The latter patent application shows that a polyester resin film having excellent formability is obtained by controlling the melting temperature, the softening temperature and the elongation at break within the range of 210° to 250° C., 175° to 235° C. and 150 to 400%, respectively.

Recently, it has been found that the elongation at break is related to the refractive index in the plane of the copolyester resin film as shown in FIG. 1. In particular, the elongation at break declines if the refractive index in the plane falls below 1.6100. Even the copolyester resin film to be laminated on the metal sheet has above 150% of the elongation at break and excellent formability with a refractive index below 1.6100 in the plane. The corrosion resistance of the metal sheet covered with this copolyester resin film becomes poor in the areas formed under severe conditions, because the amorphous and non-oriented parts in this copolyester resin film increase if the refractive index decreases. Furthermore, the gradual decrease in the elongation at break when the refractive index is above 1.6200 depends upon the increase in the degree of the orientation in the copolyester resin film.

Even if a copolyester resin film having above 150% of the elongation at break with a refractive index of 1.6700 in the plane is laminated on the metal sheet, a copolyester resin film laminated metal sheet having excellent formability is not always obtained. This is because the elongation at break of said copolyester resin film decreases after lamination.

Therefore, a copolyester resin film laminated metal sheet having excellent formability is not always obtained by using the copolyester resin film according to Japanese Patent Application No. Sho 63-75837, as the characteristics of the copolyester resin film change depending upon the laminating and reheating conditions.

This problem has been solved by the present invention by controlling the characteristics of the employed copolyester resin film before and after lamination. According to the present invention, in a copolyester resin film laminated metal sheet, where formability under severe conditions is required, it is indispensable that the mechanical property, thermal property and chemical property of the employed copolyester resin film are uniform throughout.

Therefore, the copolyester resin film used in the present invention is characterized by the restriction in the range of the refractive indexes in the thickness direction and all directions in the plane as has been described above.

In order to produce a copolyester resin film having excellent formability in all positions of the wide copolyester resin film, it is necessary that the extruded thick copolyester resin film is biaxially stretched with a lower ratio compared to that in usual polyethylene terephthalate film. For instance, it is desireable to stretch the extruded copolyester resin film 2.7 to 3.7 times in the lengthwise-direction and about 3.0 to 3.8 times in the widthwise direction and that the temperature be set at from about 150° to about 230° C.

Additionally, the amount and the particle size of a lubricant in the copolyester resin are important factors when a lubricant is used. At least one lubricant selected from silica($SiO_2$), alumina, titanium dioxide, calcium carbonate, barium sulfate and organic silicon compound is usually added during the manufacturing process of the copolyester resin film, and it is desirable to use a lubricant having an average particle size below 2.5 μm, preferably 0.5 to 2.0 μm. It is not practical to use a lubricant having a particle size above 2.5 μm, as it acts as the starting point for the growth of many cracks in the laminated copolyester resin film during severe forming. Generally, the amount of lubricant added into the copolyester resin film is determined by the quality in coiling the produced copolyester resin film and formability of the copolyester resin film laminated metal sheet. If the lubricant is not added into the copolyester resin film, it is not possible to wind the produced copolyester resin film smoothly. Usually, the addition of lubricant having a large particle size is effective in small amounts. On the other hand, a lubricant having a small particle size, must be added in a larger quantity. For example, silica having an average particle size of 2.3 μm is effective with the addition of 0.001 to 0.05 weight % to the weight of the copolyester resin. In case of silica having an average particle size of 0.3 μm, the addition of 0.05 to 5 weight % to the weight of the copolyester resin is necessary.

Copolyester resin films to be used for the outside of cans, containing inorganic color pigment such as titanium dioxide ($TiO_2$ powder), instead of coating a white enamel on the clear copolyester resin film laminated metal sheet and then curing the coated white enamel. It is desirable that the amount of the color pigment added to the copolyester resin film be 2 to 20 weight % relative to the weight of the copolyester resin. If the amount of color pigment is below 2 weight %, a satisfactory appearance is not obtained. The copolyester resin film containing color pigment above 20 weight % is not suitable in the present invention, as the formability of said film becomes noticeably poor.

Measurement of refractive indices of the copolyester resin film containing color pigment is not possible as the polarized monochromatic light used for measurement does not pass through the pigmented film. Therefore, it is necessary to produce the copolyester resin film containing color pigment under the same conditions a those for the clear copolyester resin film having the refractive index described above.

The thickness of the copolyester resin film used in the present invention should be 5 to 50 μm, preferably 10 to 30 μm. If the thickness of the employed copolyester resin film is below 5 μm, the excellent corrosion resistance after severe forming of the copolyester resin film laminated metal sheet is not obtained and continuous lamination of thin copolyester resin film to the surface treated metal sheet becomes noticeably difficult. Moreover, the use of the copolyester resin film having a thickness above 50 μm is not economically suitable for lamination on surface treated metal sheet, as the copolyester resin film used for the present invention is expensive compared with epoxy phenolic lacquers widely used in the can industry.

One side of the copolyester resin film selected by the various characteristics described above, is precoated with 0.1 to 5.0 $g/m^2$ of a resin composite containing at least one radical selected from the group consisting of an epoxy radical, a hydroxyl radical, an amide radical, an ester radical, a carboxyl radical, a urethane radical, an acryl radical and an amino radical. Epoxy resin, phenol resin, nylon resin, polyester resin, modified vinyl resin, urethane resin, acryl resin and urea resin are examples of such resin composites.

It is desirable that the resin composite be coated on one side of the copolyester resin film as uniformly and thinly as possible. This is because the bonding strength of resin composite layer to the surface treated metal sheet and the copolyester resin film becomes gradually poorer with an increase in the thickness of the precoated resin composite. However, it is very difficult to uniformly coat in amounts below 0.1 $g/m^2$ of the resin composite on the copolyester resin film. Furthermore, when the amount of the resin composite is below 0.1 $g/m^2$ or above 5.0 $g/m^2$, the bonding strength of the resin composite layer to the surface treated metal sheet and the copolyester resin film becomes noticeably poor in severely formed areas. It is preferable that the resin composite be diluted by a solvent and then coated by a roller or spray method in order to form a uniform and thin resin composite layer on the copolyester resin film. The temperature for drying a resin composite diluted by a solvent which is coated on one side of the copolyester resin film is one of the important factors in the present invention. If the temperature is below 60° C., a long time is required for the removal of solvent and the formed resin composite layer becomes tacky. When the drying temperature is above 150° C., the chemical reaction of resin composite coated on the copolyester resin film is accelerated, and the bonding strength of the resin composite to the surface treated metal sheet becomes noticeably poor. It is preferable that the drying time of the resin composite solution coated on the copolyester resin film be 5 to 30 seconds at a temperature of 60° to 150° C. If the drying time is less than 5 seconds, the solvent is not sufficiently removed. On the other hand, drying times of more than 30 seconds result in poor productivity.

A solvent having low boiling point is preferred for dissolving the resin composite as it is easily removed by heating at 60° to 150° C. The solvent has no other specific limitations. In some cases, a coloring agent, such as a dye, may be added to the resin composite dissolved into the solvent.

The surface treated metal sheet should be selected from the group consisting of a tin free steel having double layers of an upper layer of hydrated chromium oxide and a lower layer of metallic chromium, electrotinplate covered with the double layer as described above, electrotinplate covered with hydrated chromium oxide and an aluminum sheet treated in a solution containing chromate, phosphate or zirconium salt which is usually used for the treatment of aluminum drawn and ironed cans, as the metal sheet of the present invention is contemplated for use as sanitary food cans. The optimum range of hydrated chromium oxide and metallic chromium in a tin free steel is 5 to 25 $mg/m^2$ as chromium and 10 to 150 $mg/m^2$ as metallic chromium, respectively. If the amount of hydrated chromium oxide is below 5 $mg/m^2$ or above 25 $mg/m^2$ as chromium, the bonding strength to the copolyester resin film precoated with said resin composite becomes noticeably poor in severely formed areas. Although the corrosion resistance in the formed part becomes gradually poorer with a decrease in the amount of metallic chromium, even tin free steel having about 10 $mg/m^2$ of metallic chromium can be used for some applications where mild corrosion resistance is required. The electrotinplate should be cathodically treated in an electrolyte for producing an ordinary tin free steel or treated by immersion in a solution containing about 30 g/l of sodium dichromate in water. By said cathodic treatment, a double layer consisting of an upper layer of hydrated chromium oxide and a lower layer of metallic chromium is formed on the electrotinplate. It is desirable that the amount of hydrated chromium oxide and metallic chromium on electrotinplate be almost the same as that in tin free steel. However, it is preferable that the amount of metallic chromium be 10 to 50 mg/m$^2$, in order to facilitate high speed production.

In the case of immersion treatment of electrotinplate in sodium diohromate solution, a thin layer of hydrated chromium oxide in an almost constant amount (1 to 4 mg/m$^2$ as chromium) is formed on the electrotinplate. The thin hydrated chromium oxide on electrotinplate is necessary for excellent adhesion of the copolyester resin film precoated with said resin composite in severely formed area. If electrotinplate is not treated by immersion into sodium dichromate solution, the adhesion of the copolyester resin film precoated with said resin composite becomes gradually poorer during storage in an atmosphere having high humidity. If hydrated chromium oxide, having above 5 mg/m$^2$ as chromium, is formed on electrotinplate by cathodic treatment in sodium dichromate solution, adhesion of the copolyester resin film precoated with resin composite becomes noticeably poor in severely formed areas. It is considered that the difference in the adhesion of the copolyester resin film to electrotinplate depends on the quality of the hydrated chromium oxide. The hydrated chromium oxide formed by cathodic treatment in an electrolyte, for producing a tin free steel, has better adhesion to said copolyester resin film precoated with resin composite compared with that by an immersion treatment into sodium dichromate solution.

It is desirable in the present invention that the amount of plated tin in electrotinplate be from 0.5 to 5.6 g/m$^2$. If the amount of plated tin is less than 0.5 g/m$^2$, the effect of plated tin on the corrosion resistance is hardly apparent, despite further plating process. An amount of above 5.6 g/m$^2$ of tin is not economical.

The temperature of the surface treated metal sheet heated just before the lamination of the copolyester resin film precoated with resin composite, is also an important factor. This should be maintained at the melting point of said copolyester resin film ±50° C. If the temperature is above the melting point +50° C. corrosion resistance becomes noticeably poor as the copolyester resin film deteriorates by post heating after lamination.

The copolyester resin film used in the present invention cannot be easily recrystallized by the heating temperature required for curing the color printing ink or lacquer applied on the metal sheet, although a non-oriented amorphous copolyester resin layer is formed by heating. Therefore, the metal sheet maintains excellent corrosion resistance, even if it is heated at 160° to 200° C. If the lamination of the copolyester resin film precoated with resin composite to the surface treated metal sheet is carried out below the melting temperature of the copolyester resin film −50° C., the copolyester resin film is easily peeled off from the surface of the surface treated metal sheet.

In the present invention, the method for heating the surface treated metal sheet to which the copolyester resin film is laminated is not limited. However from the standpoint of continuous and stable production of the metal sheet at high speed, conduction heating by a roller heated by induction heating and induction heating and/or resistance heating which are used for reflowing electrotinplate in the production process of electrotinplate, is suitable as the method for heating the surface treated metal sheet to be laminated. This is because the surface treated metal sheet can be rapidly heated and the temperature of the heated metal sheet can be easily controlled. Furthermore, it is also preferable that heating by rollers heated by hot steam or heating for pre-heating the surface treated metal sheet to be laminated.

The surface temperature of the laminating roller is also an important factors. The surface temperature of the laminating roller should be in the range of 80° to 180° C. Below 80° C., air bubbles may easily occur between the copolyester resin film precoated with resin composite and the surface treated metal sheet, when the copolyester resin film is laminated to the metal sheet. On the other hand, at temperatures above 180° C., production of the metal sheet at high speed is prevented, because the copolyester resin film easily adheres to the laminating roller. The use of a chromium plated, ceramic or rubber laminating roller is preferable. A roller made with silicon rubber or fluorine rubber, which are excellent in heat conductivity and heat resistance, should be selected.

Usually, the copolyester resin film is laminated on the surface treated metal under the conditions described above, and then the copolyester resin film laminated metal sheet is gradually or rapidly cooled. In some applications, where more severe formability is required, it is preferable to post-heat the copolyester resin film laminated metal sheet at a temperature in the range of from the melting point −80° C. to the melting point of the copolyester resin film for 5 to 1000 seconds, in order to improve the formability of the copolyester resin film laminated metal sheet. Heating for curing the color printing ink or lacquer applied on the copolyester resin film laminated metal sheet before forming is also effective in improving the formability of the copolyester resin film laminated metal sheet. Heating to cure the color printing ink or lacquer applied on the copolyester resin film laminated metal sheet before forming, is also effective in improving the formability of the copolyester resin film laminated metal sheet.

It is considered that this effect depends on the relaxation of the residual stress of the laminated copolyester by the post heating. When this post heating is applied to the copolyester resin film laminated metal sheet before forming, the laminated copolyester resin film is not peeled off from the surface of the metal sheet and cracks in the laminated copolyester resin film is almost non-existent in severely formed areas.

The present invention is explained in further detail by reference to the following examples. These examples do not limit the scope of the invention.

EXAMPLE 1

A cold rolled steel strip having a thickness of 0.21 mm and a width of 300 mm was electrolytically degreased in a solution of 70 g/l of sodium hydroxide and then pickled in a solution of 100 g/l of sulfuric acid. The steel strip, after being rinsed with water, was cathodically treated by using an electrolyte containing 60 g/l of CrO$_3$ and 3 g/l of NaF in water under 20 A/dm$^2$ of cathodic current density at an electrolyte temperature of 50° C. The treated steel strip was rinsed with hot water having a temperature of 80° C. and dried.

After that, a biaxially oriented copolyester resin film produced from a condensation polymerization of ethylene glycol and polycarboxylic acid consisting of 85 mole % of terephthalic acid and 15 mole % of sebacic acid having characteristics shown in (A), which was precoated with a resin composite under following condition (B), was continuously laminated on both surfaces of the treated steel strip under the following condition (C).

(A) Characteristics of the Employed Copolyester Resin Film

Thickness: 25 $\mu$m
Melting temperature: 229° C.
Refractive index in thickness direction: 1.5311
Refractive index in all planar dimensions: Maximum: 1.6411 Minimum: 1.6210
Type of added lubricant: Silica ($SiO_2$)
Average particle size of added lubricant: 2.0 $\mu$m
Amount of lubricant: 0.07 weight % relative to the weight of the employed copolyester (B) Conditions for Precoating of Resin Composite to the Copolyester Resin Film Composition of precoated material:
Epoxy resin having an epoxy equivalent of 3000: 80 parts
Resol product from paracresol: 20 parts
Drying temperature of precoated resin composite: 100° C.
Drying time of precoated resin composite: 10 seconds
Amount of resin composite after drying: 0.2 g/m²

(C) Conditions for Lamination of Copolyester Resin Film Precoated Under Condition (B)

Method for heating the treated steel strip:
Roller heated by induction heating
Temperature of the treated steel strip just before lamination: 200° C.
Material of laminating roller: Silicon rubber
Surface temperature of laminating roller: Max. 180° C.
Method for cooling after lamination: Rapid cooling
Post heating of the laminate: 215° C. for 1 minute

EXAMPLE 2

Two kinds of biaxially oriented copolyester resin films produced from a condensation polymerization of ethylene glycol and polycarboxylic acid consisting of 88 mole % of terephthalic acid and 12 mole % of isophthalic acid having characteristics shown in (A), which were precoated with resin composite by the following condition (B), were simultaneously laminated on each side of the same treated steel strip as in Example 1 under the following condition (C).

(A) Characteristics of the Employed Copolyester Resin Film

Clear film
Thickness: 25 $\mu$m
Melting temperature: 229° C.
Refractive index in thickness direction: 1.5405
Refractive indexes in all planar dimensions: Maximum 1.6500 Minimum 1.6305
Type of added lubricant: Silica ($SiO_2$)
Average particle size of added lubricant: 1.5 $\mu$m
Amount of added lubricant: 0.12 weight % relative to the weight of the employed copolyester resin
White film
Thickness: 20 $\mu$m
Melting temperature: 229° C.
Type of color pigment: $TiO_2$
Average particle size of added color pigment: 0.3 $\mu$m
Amount of added color pigment: 15 weight % relative to the weight of the employed copolyester resin (B) Conditions for Precoating of Resin Composite to the Copolyester Resin Films Composition of precoated material:
Epoxy having an epoxy equivalent of 3000: 70 parts
Resol product from paracresol: 30 parts
Drying temperature of precoated resin composite: 120° C.
Drying time of precoated resin composite: 5 seconds
Amount of resin composite after drying: 1.1 g/m²

(C) Conditions for Lamination of Copolyester Resin Film Precoated Under Condition (B)

Method for heating the treated steel strip:
Roller heated by induction heating
Temperature of the treated steel strip just before lamination: 230° C.
Temperature of the treated steel strip just before lamination: 230° C.
Material of laminating roller: Silicon rubber
Surface temperature of laminating roller: Max. 210° C.
Method for cooling after lamination: Rapid cooling
Post heating of the laminate: 210° C. for 5 minutes

EXAMPLE 3

The same steel strip pretreated as in Example 1 was electroplated with 2.8 g/m² of tin by using an electrolyte containing 80 g/l of $SnSO_4$, 60 g/l of phenosulfonic acid (60%) aqueous solution) and 5 g/l of $\alpha$-naphthol sulfonic acid in water under 15 A/dm² of cathodic current density at an electrolyte temperature of 40° C. After reflowing of tin and rinsing with water, the tin plated steel strip was treated by using an electrolyte containing 30 g/l of $CrO_3$ and 0.3 g/l of $H_2SO_4$ in water under 40 A/dm² of cathodic current density at an electrolyte temperature of 50° C. The thus treated electrotinplate was rinsed with water and dried.

After that, a biaxially oriented copolyester resin film produced from a condensation polymerization of ethylene glycol and polycarboxylic acid consisting of 88 mole % terephthalic acid and 12 mole % of sebacic acid having characteristics shown in (A), which was precoated with resin composite by the following condition (B), was continuously laminated on both surfaces of thus treated steel strip under the following condition(C).

(A) Characteristics of the Employed Copolyester Resin Film

Thickness: 25 $\mu$m
Melting temperature: 243° C.
Refractive index in thickness direction: 1.5218
Refractive indexes in all planar dimensions: Maximum 1.6312 Minimum 1.6228
Type of add lubricant: Silica ($SiO_2$)
Average particle size of added lubricant: 0.3 $\mu$m
Amount of added lubricant: 0.81 weight % relative to the weight of the employed copolyester resin (B) Conditions for Precoating of Resin Composite to the Copolyester Resin Film Composition of precoated resin composite Epoxy resin having an epoxy equivalent of 2500: 75 parts Resol product from paracresol: 25 parts Drying temperature of precoated resin composite: 75° C.

Drying time of resin composite after drying: 15 sec.

Amount of resin composite after drying: 1.2 g/m²

(C) Conditions for Lamination of Copolyester Resin Film Precoated Under Condition (B)

Method for heating the treated steel strip: Resistance Heating

Temperature of the treated steel strip just before lamination: 228° C.

Material of laminating roller: Silicon rubber

Surface temperature of laminating roller: 200° C.

Method for cooling after lamination: Gradual cooling

Post heating of the laminate: 220° C. for 30 seconds

EXAMPLE 4

The same steel strip pretreated as in Example 1 was electroplated with 1.5 g/m² of tin by using an electrolyte containing 10 g/l of $SnSO_4$, 20 g/l of phenolsulfonic acid (60% aqueous solution) and 4 g/l of ethoxylated α-naphthol in water under 3 A/dm² of cathodic current density at an electrolyte temperature of 45° C. After rinsing with water, the tin plated steel strip was treated by an immersion into 30 g/l of sodium dichromate solution for 3 seconds at a temperature of 45° C. The thus treated electrotinplate strip was rinsed with water and dried.

After that, a biaxially oriented copolyester resin film produced from a condensation polymerization of ethylene glycol and polycarboxylic acid consisting of 80 mole % of terephthalic acid and 20 mole % of sebacic acid having characteristics shown in (A), which was precoated with the same resin composite as in Example 3, was continuously laminated on both surfaces of thus treated steel strip under the following condition (C).

(A) Characteristics of the Employed Copolyester Resin Film

Thickness: 25 μm

Melting temperature: 215° C.

Refractive index in thickness direction: 1.5100

Refractive indexes in all planar dimensions: Maximum 1.6211 Minimum 1.6110

Type of the added lubricant: $TiO_2$

Average particle size of added lubricant: 0.5 μm

Amount of added lubricant: 0.52 weight % relative to the weight of the employed copolyester resin (B) Conditions for Lamination of Copolyester Resin Film Precoated Under Condition (B) of Example 3

Method for heating the treated steel strip: Resistance heating

Temperature of the treated steel strip just before lamination: 234° C.

Material of laminating roller: Fluorine rubber

Surface temperature of laminating roller: 180° C.

Method for cooling after lamination: Rapid cooling

Post heating of the laminate: 190° C. for 30 seconds

EXAMPLE 5

An aluminum strip (JIS 3004) having a thickness of 0.23 mm was cathodically degreased in a solution of 30 g/l of sodium carbonate. After being rinsed with water, the aluminum strip was immersed into 5% Alodine 401-41 (Chromate-Phosphate type) solution made by Nippon Paint Co., Ltd. for 20 seconds at 45° C. and then rinsed with water and dried.

After that, the same biaxially oriented copolyester resin film as shown in (A) of Example 1, which was precoated with the same resin composite as in (B) of Example 1, was continuously laminated on both surfaces of thus treated aluminum strip under the same conditions as in condition (C) of Example 1.

COMPARATIVE EXAMPLE 1

A biaxially oriented copolyester resin film produced from a condensation polymerization of ethylene glycol and polycarboxylic acid consisting of 85 mole % of terephthalic acid and 15 mole % of sebacic acid having characteristics shown in (A), which was precoated with the same resin composite as in Example 1, was continuously laminated on both surfaces of the same treated steel strip as in Example 1 under the same condition as in (C) of Example 1.

(A) Characteristics of the Employed Copolyester Resin Film

Thickness: 25 μm

Melting temperature: 229° C.

Refractive index in thickness direction: 1.5334

Refractive indexes in all planar dimensions: Maximum 1.6473 Minimum 1.6022

Type of added lubricant: Silica ($SiO_2$)

Average particle size of added lubricant: 2.0 μm

Amount of added lubricant: 0.07 weight % relative to the weight of the employed copolyester resin

COMPARATIVE EXAMPLE 2

A biaxially oriented copolyester resin film produced from a condensation polymerization of the ethylene glycol and polycarboxylic acid consisting of 88 mole % terephthalic acid and 12 mole % of isophthalic acid having characteristics shown in (A), which was precoated with the same resin composite as in Example 1, was continuously laminated on both surfaces of the same treated steel strip as in Example under the same conditions as in condition (C) of Example 1.

(A) Characteristics of the Employed Copolyester Resin Film

Thickness: 25 μm

Melting temperature: 229° C.

Refractive index in thickness direction: 1.5110

Refractive indexes in all planar dimensions: Maximum 1.6720 Minimum 1.6390

Type of added lubricant: Silica

Average particle size of added lubricant: 2.0 μm

Amount of added lubricant: 0.07 weight % relative to the weight of the employed copolyester resin

COMPARATIVE EXAMPLE 3

A biaxially oriented copolyester resin film produced from a condensation polymerization of ethylene glycol and polycarboxylic acid consisting of 83 mole % of terephthalic acid and 17 mole % of isophthalic acid having characteristics shown in (A), which was precoated with the same resin composite as in Example 3, was continuously laminated on both surfaces of the same treated steel strip as in Example 3 under the same conditions as in condition (C) of Example 3.

(A) Characteristics of the Employed Copolyester Resin Film

Thickness: 25 μm
Melting temperature: 212° C.
Refractive index in thickness direction: 1.5442
Refractive indexes in all directions in the plane: Maximum 1.6041 Minimum 1.5986
Type of added lubricant: Silica
Average particle size of added lubricant: 2.3 μm
Amount of added lubricant: 0.07 weight % relative to the weight of the employed copolyester resin

COMPARATIVE EXAMPLE 4

A biaxially oriented copolyester resin film produced from a condensation polyermization of ethylene glycol and polycarboxylic acid consisting of 85 mole % of terephthalic acid and 15 mole % of sebacic acid having characteristics shown in (A), which was precoated with the same resin composite as in Example 3, was continuously laminated on both surfaces of the same treated steel strip as in Example 4 under the same conditions as the condition (B) of Example 4.

(A) Characteristics of the Employed Copolyester Resin Film

Thickness: 25 μm
Melting temperature: 215° C.
Refractive index in thickness direction: 1.5311
Refractive indexes in all directions in the plane: Maximum 1.6331 Minimum 1.6098
Type of added lubricant: Silica
Average particle size of added lubricant: 2.9 μm
Amount of added lubricant: 0.05 weight % relative to the weight of the employed copolyester resin

COMPARATIVE EXAMPLE 5

The same biaxially oriented copolyester resin film as in Example 1, which was precoated with the same resin composite as in Example 1, was continuously laminated on both surfaces of the same treated aluminum strip as in Example 5 under the same conditions as in Example 1, except the temperature of the treated aluminum strip just before lamination being 162° C.

The formability and the corrosion resistance of the resultant metal sheet were evaluated by the following testing methods, after the measurement of the coating weight on the resultant metal sheet by X-ray fluorescent method. The results are shown in the Table.

(1) Formability by Deep Drawing

The resultant metal sheet was cut by a punch press, to a circular blank having a diameter of 158 mm. The blank was deeply drawn to form a cylindrical cup at a drawing ratio of 2.92. The formability of the resultant metal sheet was evaluated by the degree of cracks in the copolyester resin film and the degree in the peeling off of the copolyester resin film in the formed area and then divided into 5 ranks. 5 was excellent, 4 was good, 3 was fair, 2 was poor and 1 was bad.

(2) Formability by Impact Bending

The resultant metal sheet was cut to a size of 30 mm×50 mm. The sample was pre-bent by a rod having a diameter of 3 mm and was then bent by dropping a load weighing 2.3 kg from a height of 30 cm. The formability, by bending the resultant metal sheet, was evaluated by the degree of cracks in the copolyester re in film in the bent area by use of a microscope. It was then divided into the 5 ranks, as described above.

(3) Corrosion Resistance After Cup Drawing

The resultant metal sheet was cut by a punch press to a circular blank having a diameter of 85 mm. The blank was deeply drawn to form a cylindrical cup at a drawing ratio of 2.15. The drawn cup was filled with Coca Cola and stored at 20° C. After 3 months, iron pick-up was measured by using an atomic absorption method.

COMPARATIVE EXAMPLE 6

It is clear that the laminate according to the present application differs from that of the prior art especially as to the Inui Patent GB 2164899. Thus the invention is constructed of triple layers and that of Inui of double layers. The refractive indices and the infrared spectra of the laminated films were measured from the upper side and the lower side of the laminated films after the films were peeled off from the metal sheet by a dissolution of the metal sheet by using samples prepared by the following method.

Preparation of Samples

Copolyester resin film (Polyethylene terephthalate: 88 mole %, Polyethylene isophthalate: 12 mole %) having a thickness of 25 μm, and a melting temperature of 230° C. which has been precoated with an amount of 0.7 g/m² of a resin composite consisting of 80 parts of epoxy resin having an epoxy equivalent of 3000 and 20 parts of resol product from paracresol and then dried at 100° C. was laminated on a tin free steel at a laminating temperature of 260° C. and 220° C., respectively to obtain two different samples.

The laminate obtained at a laminating temperature of 260° C. corresponds to an example in the present application. The laminate obtained at a laminating temperature of 220° C. corresponds to an example in the Inui Patent.

The results are shown in the following Table A.

TABLE A

Comparison of refractive indices and infrared spectra of the laminated polyester resin film according to the application and the Inui patent

| | Sample | | | |
|---|---|---|---|---|
| | Polyester film in our appl. | | Polyester film in Inui Patent | |
| | Measured side in polyester film | | | |
| Items | Upper side | Lower side | Upper side | Lower side |
| Planar orientation coefficient before laminating | 0.1015 | | | |
| Refractive index in the lengthwise direction | 1.615 | 1.550 | 1.625 | 1.610 |
| Refractive index in the widthwise direction | 1.620 | 1.550 | 1.625 | 1.615 |
| Refractive index in the thickness direction | 1.520 | 1.520 | 1.520 | 1.520 |
| Planar orientation coefficient | 0.098 | 0.030 | 0.105 | 0.093 |
| Presence of polyester resin layer | Yes | Yes | Yes | Yes |
| Presence of phenol-epoxy resin layer | No | Yes | No | Yes |

As shown in table A described above, the planar orientation coefficient of the laminated copolyester resin film determined by the refractive indices which is measured from the upper side of the laminated copolyester resin film does not almost change by lamination in the laminates according to the present application and the Inui Patent. However, the planar orientation coefficient determined by the refractive indices which is measured from the lower side of the laminated copolyester resin film changes to a remarkably small value in the case of our application. This phenomenon means the formation of the non-oriented amorphous copolyester resin layer in the lower side of the laminated copolyester resin film because the lower layer of the copolyester resin film is heated to a temperature of above the melting temperature of the employed copolyester resin film. On the other hand, in the case of the Inui Patent, the planar orientation coefficient determined by the refractive indexes which is measured from the lower side of the laminated copolyester resin film changes only to slightly small value.

This phenomenon means that in Inui there can be only slight formation of the non-oriented amorphous copolyester layer because the lower layer of the laminated copolyester resin film is heated at a temperature of below the melting temperature of the employed copolyester resin film.

The infrared spectrum of the laminated copolyester resin film precoated with a resin composite is measured from the upper side and the lower side of the laminated copolyester resin film which is peeled off from the base metal sheet by the refraction method using an infrared spectrometer. The infrared spectrum observed in the laminated copolyester resin film according to the application is the same as that in the Inui patent.

Therefore, it is found from the results described above that the laminated film according to our application is constructed of a triple layer. However, the laminated film according to the Inui patent is construed only of a double layer consisting of an upper layer of biaxially oriented copolyester resin and a lower layer of a resin composite.

Furthermore, it is found from the specification of the Heyes Patent (GB 8903 303) that the laminated polyester resin film according to Heyes is constructed with double layers consisting of an upper layer of biaxially oriented polyester resin and a lower layer of an amorphous polyester resin without a resin composite.

Effects of each layer in the laminate according to the present application:

As described above, the polyester resin film laminated metal sheet is constructed of triple layers consisting of an upper layer of biaxially oriented copolyester resin layer, a middle layer of an amorphous copolyester resin layer and a lower layer of a resin composite.

The presence of the biaxially oriented copolyester resin layer is necessary for the maintenance of an excellent corrosion resistance after severe forming because the biaxially oriented copolyester resin layer forms an excellent barrier with respect to the packed contents.

The presence of the amorphous copolyester resin layer is indispensable in the present application for the maintenance of an excellent formability of the laminate. If the amorphous copolyester resin layer is not present as a middle layer, many cracks arise in the laminated biaxially oriented copolyester or the laminated biaxially oriented copolyester resin film is easily peeled off by severe forming such as a drawn and stretch forming. The invention is directed to use for drawn and stretched forms.

The presence of a resin composite layer is necessary to obtain an excellent corrosion resistance in the severe formed parts, after packing the corrosive contents. Especially, the resin composite layer prevents the corrosion of the base metal sheet in the cracked parts of the laminated copolyester resin film because the resin composite layer consisting of thermosetting resin has an excellent resistance to any alkaline substance compared with that of the copolyester resin film. If the resin composite layer is not present, the corrosion of the base metal sheet in the cracked part of the laminated copolyester resin film is accelerated by the cathodic delamination of the laminated copolyester resin film, because it is considered that the point of the corrosion reaction in the interface between the laminated copolyester resin film and the surface of the metal sheet changes due to alkaline conditions.

As described above, each layer has in the copolyester resin film laminated metal sheet according to our application has an importance action in order to obtain an excellent formability and an excellent corrosion resistance after severe forming.

Therefore, it is indispensable in the copolyester resin film laminated metal sheet according to the present application that a metal sheet be covered with a triple layer consisting of an upper layer of a biaxially oriented copolyester resin, a middle layer of an amorphous copolyester resin and a lower layer of a resin composite being a thermosetting resin.

The terms and expression which have been employed are used as terms of description and not of limitation, and there is no intention in the use of such terms and expressions of excluding any equivalents of the features shown and described or portions thereof, it being recognized that various modifications are possible within the scope of the invention.

TABLE 1

| | | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 |
|---|---|---|---|---|---|---|---|---|---|---|---|
| Metal sheet | Base metal | Steel | Steel | Steel | Steel | Al | Steel | Steel | Steel | Steel | Al |
| | Coating weight | $Cr^o$ | $Cr^o$ | Sn | Sn | $Cr^{ox}$ + $PO_4$ | $Cr^o$ | $Cr^o$ | Sn | Sn | $Cr^{ox}$ + $PO_4$ |
| | ($g/m^2$) | 0.120 | 0.120 | 2.8 | 1.5 | 0.008 | 0.120 | 0.120 | 2.8 | 1.5 | 0.008 |
| | | $Cr^{ox}$ | $Cr^{ox}$ | $Cr^o$ | $Cr^{ox}$ | | $Cr^{ox}$ | $Cr^{ox}$ | $Cr^o$ | $Cr^{ox}$ | |
| | | 0.015 | 0.015 | 0.015 | 0.003 | | 0.015 | 0.015 | 0.015 | 0.003 | |
| | | | | $Cr^{ox}$ | | | | | $Cr^{ox}$ | | |
| | | | | 0.010 | | | | | 0.010 | | |
| Copolyester resin film after lami. | RI in thickness direction | 1.5300 | 1.5395 | 1.5190 | 1.5160 | 1.5290 | 1.5520 | 1.5180 | 1.5390 | 1.5330 | 1.5311 |
| | Max. RI in plane | 1.6395 | 1.6510 | 1.6358 | 1.6115 | 1.6390 | 1.6311 | 1.6790 | 1.5960 | 1.6300 | 1.6389 |
| | Min. RI in plane | 1.6180 | 1.6311 | 1.6300 | 1.6005 | 1.6175 | 1.5900 | 1.6411 | 1.5900 | 1.6081 | 1.6195 |
| Properties of samples | Formability by deep drawing | 5 | 5 | 5 | 5 | 5 | 4 | 1 | 2 | 5 | 1 |
| | Formability by impact bending | 5 | 5 | 5 | 5 | 5 | 1 | 5 | 1 | 5 | 5 |
| | Corr. resistance | Fe | Fe | Fe | Fe | Al | Fe | Fe | Fe | Fe | |

TABLE 1-continued

|  | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 |
|---|---|---|---|---|---|---|---|---|---|---|
| (Fe, Al pick up) | 0.02 | 0.01 | 0 | 0 | 0 | 30.6 | 106.3 | 50.6 | 2.60 | Delami. |

Remarks:
*1 RI represents the refractive index.
*2 $Cr^o$ represents metallic Cr and $Cr^{ox}$ represents Cr in hydrated Cr oxide.
*3 Fe and Al pick up is shown by ppm.

What is claimed is:

1. A copolyester resin composite laminated on a surface treated metal sheet for a drawn and stretch-formed can, wherein the copolyester resin composite consists of
   (i) an outer layer of a biaxially oriented copolyester resin film consisting of about 75 to 99 mol % polyethylene terephthalate and about 1 to 25 mol % of a polyester resin produced by esterification of at least one saturated polycarboxylic acid and at least one saturated polyalcohol wherein the film is stretched about 2.7 to 3.7 times in the length direction and about 3.0 to 3.8 times in the width direction at a temperature of about 150° C. to 230° C. said stretched film having a melting point of about 1.5000 to about 1.5500 in the thickness direction of said film, an index of refraction of from about 1.6000 to about 1.6600 relative to its planar dimensions and less than 0.130 of a planar orientation coefficient,
   (ii) a middle layer of a non-oriented amorphous copolyester resin formed by partial melting of said biaxially oriented copolyester resin film,
   (iii) an inner layer of a thermosetting resin applied to the middle layer wherein said resin contains at least one radical selected from the group consisting of an epoxy, a hydroxyl, an amide, an ester, a urethane, an acryl and an amino radical, and
   wherein the side of said biaxially oriented copolyester resin film coated with said resin is laminated to said surface treated metal sheet and wherein at least one side of said surface treated metal sheet has said biaxially oriented copolyester resin film, laminated thereto at a temperature of Tm to Tm+50° C., wherein Tm is the melting point of said biaxially oriented copolyester resin film.

2. The copolyester resin composite of claim 1 further comprising a lubricant in said biaxially oriented copolyester resin outer layer and said non-oriented amorphous copolyester resin middle layer characterized by a particle size below about 2.5 μm.

3. The copolyester resin composite of claim 1 wherein an index of refraction in planar dimensions of said biaxially oriented copolyester resin film is from about 1.6100 to about 1.6500.

4. The copolyester resin composite of claim 1 wherein said biaxially oriented copolyester resin film comprises from about 75 to 99 mole percent of polyethylene terephthalate and from about 1 to 25 mole percent of a polyester resin produced by esterification of at least one saturated polycarboxylic acid selected from the group consisting of phthalic acid, isophthalic acid, terephthalic acid, succinic acid, azelaic acid, adipic acid, sebacic acid, diphenyl carboxylic acid, 2,6-naphthalene dicarboxylic acid, 1,4-cyclohexane dicarboxylic acid and trimellictic acid anhydride with at least one saturated polyalcohol selected from the group consisting of ethylene glycol, 1,4-butane diol, 1,5-pentane diol, 1,6-hexane diol, propylene glycol, polytetramethylene glycol, trimethylene glycol, triethylene glycol, neopentyl glycol, 1,4-cyclohexane dimethanol, trimethylol propane and pentaerythritol.

5. The copolyester resin composite of claim 1 wherein said biaxially oriented copolyester resin film has a thickness of from about 5 to about 50 μm.

6. The copolyester resin composite of claim 1 wherein the amount of said thermosetting resin precoated onto the middle layer is from about 0.1 to about 5.0 g/m².

7. The copolyester resin composite of claim 1 wherein said surface treated metal sheet is selected from the group consisting of a steel sheet covered with a double layer consisting of an upper layer of hydrated chromium oxide and a lower layer of metallic chromium, an electrotinplated steel sheet covered with said double layer, an electrotinplated steel sheet covered with a single layer of hydrated chromium oxide and an aluminum sheet treated in a solution containing chromate, phosphate or zirconium salt.

8. The copolyester resin composite of claim 7 wherein the amount of chromium in said hydrated chromium oxide is from about 5 to 25 mg/m² in said double layer on said steel sheet or said electrotinplated steel sheet and the amount of said metallic chromium is about 10 to 150 mg/m² in said double layer.

9. The copolyester resin composite of claim 7 wherein the amount of the plated tin in said electrotinplated steel sheet is from about 0.5 to about 5.6 g/m².

10. The copolyester resin composite of claim 7 wherein the amount of chromium in said single layer of hydrated chromium oxide on said electrotinplated steel sheet is from about 1 to about 4 mg/m².

11. The copolyester resin composite of claim 1 wherein said biaxially oriented copolyester resin outer layer and said non-oriented amorphous copolyester resin middle layer contain from about 2 to 20 weight percent of an inorganic pigment.

12. The copolyester resin composite of claim 11 wherein said inorganic pigment is titanium dioxide.

13. The copolyester resin composite of claim 1 wherein the planar orientation coefficient of said biaxially oriented copolyester resin composite is from about 0.05 to about 0.125.

* * * * *

UNITED STATES PATENT AND TRADEMARK OFFICE
CERTIFICATE OF CORRECTION

PATENT NO. : 5,272,011
DATED : December 21, 1993
INVENTOR(S) : Atsuo Tanaka, et al.

It is certified that error appears in the above-indentified patent and that said Letters Patent is hereby corrected as shown below:

Col. 19, line 23: claim 1, line 13, after "melting point of" insert -- from about 210°C to 250°C, an index of refraction of from --.

Signed and Sealed this

Fourth Day of October, 1994

Attest:

BRUCE LEHMAN

*Attesting Officer*    Commissioner of Patents and Trademarks